United States Patent [19]

Dohmeier

[11] Patent Number: 4,646,805
[45] Date of Patent: Mar. 3, 1987

[54] CHAIN WINCH

[76] Inventor: Hans-Otto Dohmeier, P.O. Box 11322, Johannesburg, South Africa, 2000

[21] Appl. No.: 666,962

[22] Filed: Oct. 31, 1984

[30] Foreign Application Priority Data

Nov. 18, 1983 [ZA] South Africa ............... 83/8610

[51] Int. Cl.⁴ .............. B60C 27/00; B60C 27/10; B66D 3/00
[52] U.S. Cl. .................. 152/172; 24/68 CT; 24/68 TT; 81/15.8; 152/213 A; 188/72.3; 188/77 W; 188/82.9; 188/166; 192/11; 192/17 R; 254/223; 254/243; 254/358; 254/372; 254/378
[58] Field of Search ........... 152/213 A, 213 R, 172, 152/189; 81/15.8; 254/221, 222, 223, 243, 358, 372, 375, 376, 378; 24/32, 68 CT, 68 TT, 69 T, 69 TT; 192/11, 17 R; 174/138, 155; 188/72.1, 72.3, 77 R, 77 W, 82.6, 82.9, 166, 78, 67

[56] References Cited

U.S. PATENT DOCUMENTS

| 736,323 | 8/1903 | Warner ................... 254/221 |
| 2,548,846 | 4/1951 | Robins et al. ............ 254/358 X |
| 3,883,119 | 5/1975 | Hansson ................. 188/82.9 X |
| 4,156,520 | 5/1979 | Holland ................. 254/223 |
| 4,162,059 | 7/1979 | Fletchall ............... 254/375 X |
| 4,282,916 | 8/1981 | Carlson ................. 152/219 X |
| 4,456,047 | 6/1984 | Ishida .................. 152/213 A |
| 4,481,990 | 11/1984 | Rieger et al. ........... 152/172 |

*Primary Examiner*—Donald Czaja
*Assistant Examiner*—Thomas Bokan

[57] ABSTRACT

A chain winch 10 having a sprocket wheel 14 of polygonal cross-section with flat faces 32 dimensioned in dependence on the dimensions of a link chain to be used therewith and having pin formations 36 for engaging between or in chain links. The winch includes a self latching pawl 48 engageable with the chain links and a braking mechanism 16 for controlled unwinding when required in use. The winch is simple and inexpensive and the sprocket tolerant of chain dimensions so that it can be used with uncalibrated chain. This winch, amongst other things, has application for permanent fitting to a tire chain for tensioning it on to a tire.

15 Claims, 9 Drawing Figures

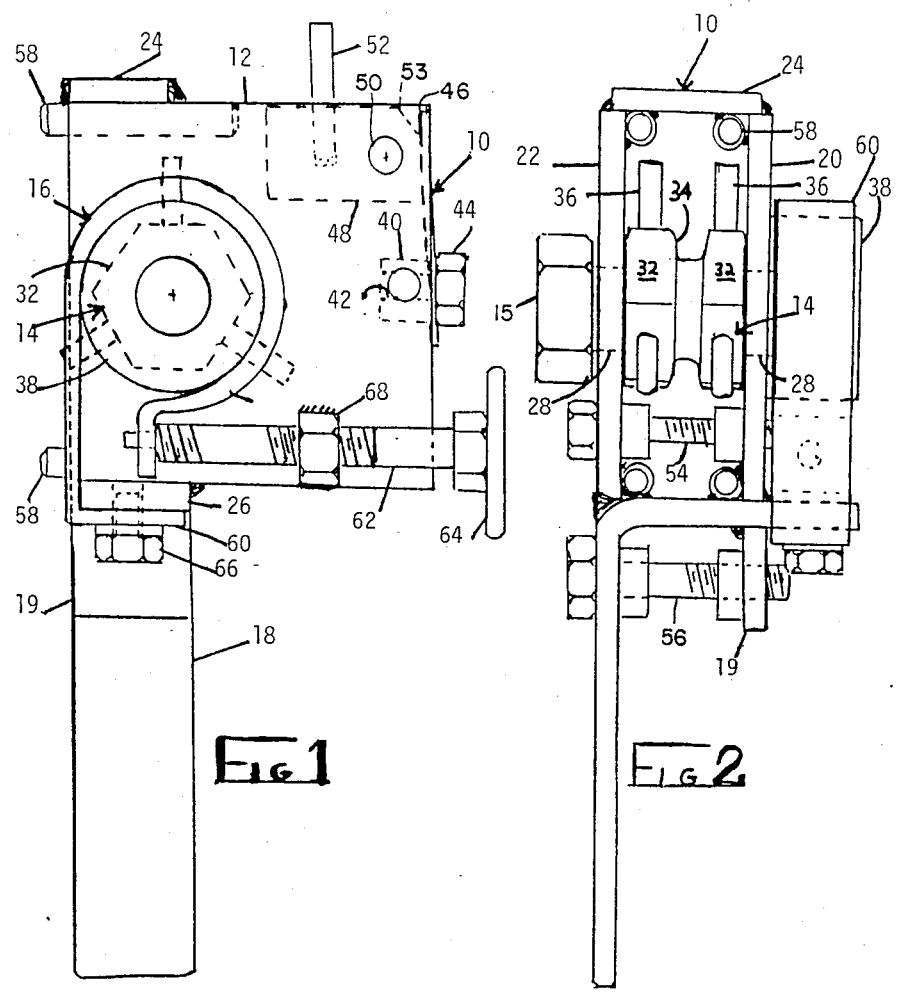
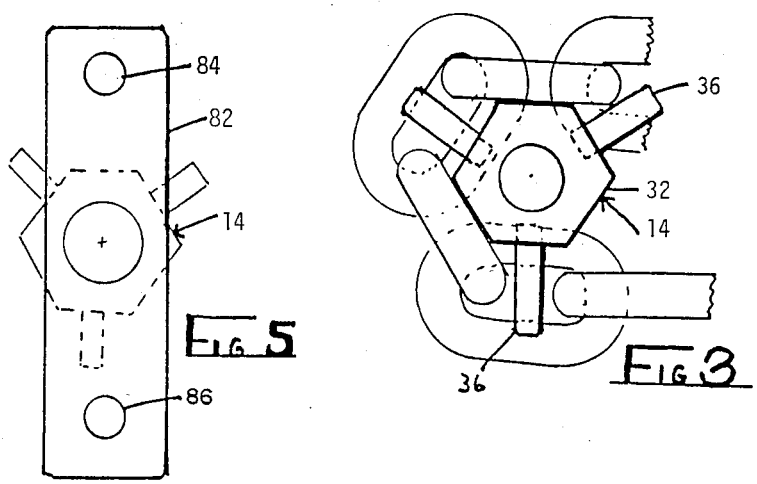

CHAIN WINCH

FIELD OF THE INVENTION

This invention relates to winches and is particularly concerned with chain winches. The invention is also concerned with an application of such a winch to heavy duty tire protective or traction chains, for example as used in quarrying or logging operations.

BACKGROUND TO THE INVENTION

Chain winches are well known and are available in many forms. They may be geared and electrically, hydraulically or manually driven, the last mentioned drive being through a lever or an endless chain normally. While effective such chain winches tend to be relatively expensive because, amongst other things, of the precision required for manufacture. In particular the winch must have a sprocket wheel which is accurately formed and which must be used with a calibrated link chain, both of which are expensive.

An object of the invention is to provide a relatively inexpensive chain winch.

SUMMARY OF THE INVENTION

According to one aspect of the invention there is provided a chain winch for transmitting motion to a chain comprising a housing; sprocket means rotatably supported in the housing, the sprocket means having a plurality of substantially radially extending pin formations for engaging selected links of the chain; drive means for rotating the sprocket means; and resiliently biased latch means for preventing undesired reverse rotation of the sprocket means.

Preferably the chain winch includes brake means for controlling reverse movement or unwinding of the winch. Preferably the winch also has handle means for facilitating manipulation of the winch.

According to another aspect of the invention there is provided a chain winch of the type described above in combination with a tire protective or traction chain formed of links and including a tread portion, first and second side wall portions flanking the tread portion and apparatus for tensioning the tire chain to hold it on to a tire provided on at least the first side wall portion, the tensioning apparatus comprising a tensioning chain and a plurality of connecting means each having a part through which the tire tensioning chain can pass for connecting the tensioning chain to edge links of the first side wall portion of the chain, with the chain winch being connected to one end of the tensioning chain and with the other end of the tensioning chain being tensionable by the chain winch.

Further features, advantages and details of the invention are set out in the appended claims which are to be regarded as an integral part of this disclosure.

Embodiments of the invention are described below by way of example with reference to the accompanying schematic drawings.

BRIEF DESCRIPTION OF THE DRAWINGS

FIG. 1 shows a schematic side view of an embodiment of chain winch of the invention;

FIG. 2 shows an end view of the winch of FIG. 1;

FIG. 3 shows a side view of the sprocket of the winch of FIGS. 1 and 2, the sprocket being shown in engagement with a portion of a length of chain;

FIG. 5 shows a schematic side view of a pulley block for use with a chain winch;

DESCRIPTION OF PREFERRED EMBODIMENTS

Figure 4:
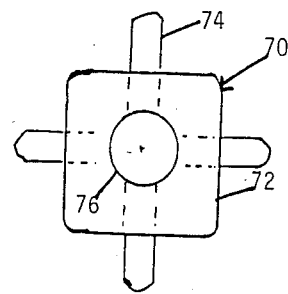
FIG. 4 shows a side view of a variant of sprocket for the winch of FIGS. 1 and 2.

With reference to FIGS. 1 to 3 there is shown a chain winch 10 comprising a housing 12, a sprocket 14 supported in the housing and having a drive nut 15 extending beyond the housing, brake means 16 for controlling rotation of the sprocket, and a handle portion 18.

The housing 12 comprises two spaced parallel side plates 20 and 22 and spacers 24 and 26 welded across the side plates 20 and 22 and holding them apart. The spacer 26 has a portion bent to form the handle 18. The side plates 20 and 22 have registering holes 28 in which axle portions 30 of the sprocket 14 are rotatably supported.

The sprocket 14 is formed by machining a hexagonal bar to form two hexagonal portions 32 with a groove 34 between them. Extending radially outwards from alternate hexagon faces are pins 36 arranged in pairs each secured in a bore formed in a flat face of the body portion. The axle portion 30 remote from the drive nut is welded to a brake member or hub 38 which is outside the housing 12.

Welded between the side plates 20 and 22 is a support and spacing member 40 which has a tapped bore 42 which receives a screw 44. The screw 44 secures a flat spring 46 which acts on a pawl 48 that pivots on a pin 50. The pawl 48 is arranged and biased by the spring 46 to engage a chain link to prevent the sprocket from moving in the reverse direction. Extending from the pawl 48 is a short bar 52 by means of which the pawl 48 can be moved out of engagement with the chain when unwinding of the winch is required. The pawl has a flat 53 on one corner as shown so that when the pawl is moved out of engagement with the chain it automatically sets in an unlocking position against the spring 46.

The housing side plates 20 and 22 also support an anchoring bolt 56 and an anchoring bolt 54 by means of which the winch can be supported from a suitable support or which may be used for connecting the free end of a chain being used with the winch.

Also welded inside the housing at the corners thereof are four guide pins 58 for guiding a chain in use through the winch.

A bracket member 19 is welded to one of the side plates parallel to the handle 18 and a further anchoring bolt is supportable between the handle 18 and bracket 19 again for securing a free end of the chain or securing the winch to a support.

The brake 16 comprises, as mentioned previously, a hub 38, a brake band 60 and an adjusting screw 62 having a T-bar head 64. One end of the brake band 60 is secured to a portion of the spacer 26 by means of a bolt 66, while the other end of the band has a hole through which a reduced diameter portion at the front of the bolt 62 passes. The bolt 62 screw engages in a nut 68 that is welded to the side plate 20.

In practice the winch 10 is made of mild steel or a suitable alloy steel and is heat treated and carburised, the brake band 60 and flat spring 46 being removed during heat treatment and carburisation.

In use a length of suitable chain, that is a chain in which the length of the links matches the hexagon faces, is threaded around the sprocket as shown in FIG. 1. The chain is tensioned simply by turning the drive nut 16 with a suitable spanner with the pawl automatically locking the chain against reverse movement. When it is desired to reverse the direction of movement of the chain the drive spanner is turned in the tightening direction until the pawl is moved out of its fully locking position, whereafter the screw 62 is tightened to actuate the brake 16 and lock the sprocket. At this stage the pawl can then be moved out of engagement with the chain by applying force to the pin 52 and setting it in its unlocked position. The winch can now be unwound in a controlled manner simply by adjusting the position of the screw 62 to vary the braking force.

FIG. 4 shows a variant of sprocket 70 comprising two square plates 72 spaced apart and welded to pins 74 arranged as shown. Stub axle portions 76 extend outwardly away from the plates 72 so that the sprocket can be supported in the housing 10. With this variant of sprocket the pins 74 engage in the holes in alternate links with the adjacent links - which are at right angles to the first mentioned links - being accommodated in the gap between the two plates 72.

FIG. 5 shows a pulley block suitable for use with the chain winch described above and having a number of parts in common with it. The pulley block comprises two links of flat bar formed with registering holes and which support a sprocket 14 of the type described above. Towards one end of the bars 82 there is a securing stud 84 which holds the plates on to the sprocket 14. Towards the other end of the bars 82 there is an anchoring bolt arrangement 86 similar to the anchoring bolt 56 described above.

Figure 6:
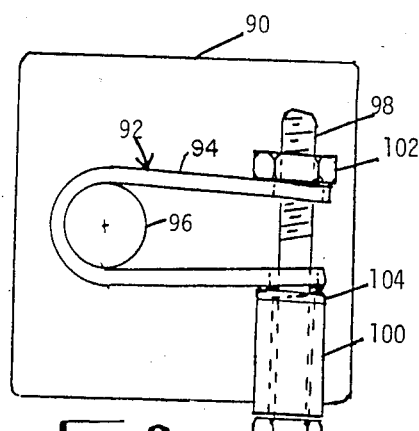
FIG. 6 shows a side view of a portion of a chain winch having a variant of brake means.

FIG. 6 shows a side view of a winch 90 which has another brake means 92. In this event the brake means 92 comprises a flat bar 94 having holes at each end and bent into a U-shape, the internal cross-section of which partly surrounds a stub axle portion 96. In practice the stub axle portion 96 would be formed integrally with the sprocket 14. The flat bar 94 is actuated or clamped to provide a braking force on the stub axle 96 by means of a bolt 98 which passes substantially freely through a bush 100 welded to a side plate of the winch and has a tightening nut 102 which is held against rotation by interference with the side plate of the winch. Between the nut 102 and the adjacent portion of the flat bar 94 there is a spring washer 104 so as to ensure a smooth application or removal of braking force.

Figure 7:
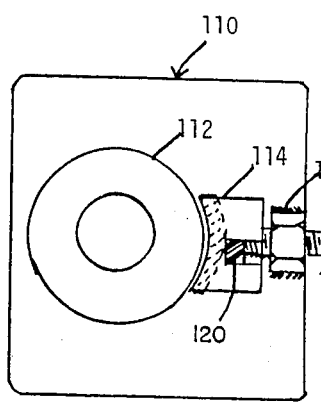
FIG. 7 shows a side view of a portion of a chain winch with another variant of brake means.

FIG. 7 shows another variant of winch 110 which has a brake hub 112 similar to the hub 38 shown in FIGS. 1 and 2. In this event the brake hub 112 is acted on by a brake shoe 114 of any suitable material such as steel, alloy steel, cast iron, brass, phosphorbronze, copper or an appropriate composite, the shoe 114 being guided on and actuated by a bolt 116 an end region of the shank of which seats in a cavity in the shoe 114. The bolt 116 is in screw engagement with a nut 118 welded to a side plate of the winch. Between the leading end of the bolt 116 and the bottom of the recess in the shoe 114 is a suitable spring to provide or ensure controlled breaking forces. The spring shown in this embodiment is a polyurethane body 120, though this could be replaced by any other suitable Belleville washer or coil spring.

Figure 8:
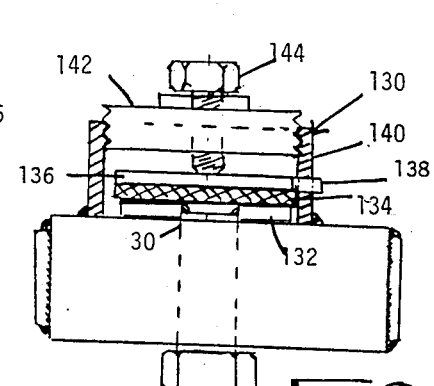
FIG. 8 shows an end view of a portion of another embodiment of chain winch having a yet further variant of brake means.

FIG. 8 shows yet another variant of braking device 130 for a winch. This braking device 130 comprises a washer 132 welded to the axle portion 30 of a sprocket, a disc of suitable friction material, such as metal or brake-lining material 134, a pressure plate 136 having a key portion 138, an enclosure formed by a length of internally threaded tubing 140, a closure nut 142 and an adjusting nut 144 for applying selected brake forces. The key 138 fits into a slot, not visible, in the tube 140 so that turning movements of the sprocket are not transmitted to the closure nut 142 or adjusting nut 144. Again suitable spring means, not shown, may be provided to act between the adjusting nut 144 and pressure plate 136.

The winch described above is, as will be obvious, relatively simple to make and tolerant of variations in chain dimensions. Thus, uncalibrated chain which is much less expensive than calibrated chain may be used. Convenient lengths of the chain may consequently be obtained by any user of the winch. The heat treating and carburising of the winch ensures that it will have a long life, show minimal wear of relatively moving parts, and be capable of withstanding considerable abuse in use. Winches of the invention have been tried with success and proved to be effective with regards to cost and performance in the half ton to 2 ton categories, though obviously the winch is not limited to these specifications.

It is to be understood that the invention is not limited to the precise constructional details shown in the drawings and described above. For example the brake bands 60 and 94 referred to above would normally be of mild steel bar, but these could be replaced by any other suitable material, e.g. brass depending on the intended capacity of the winch. Instead of metal they may also be of an appropriate plastics material such as that used for conveyor belting or drive belts, or leather, or composites of woven material and rubbers.

Figure 9:
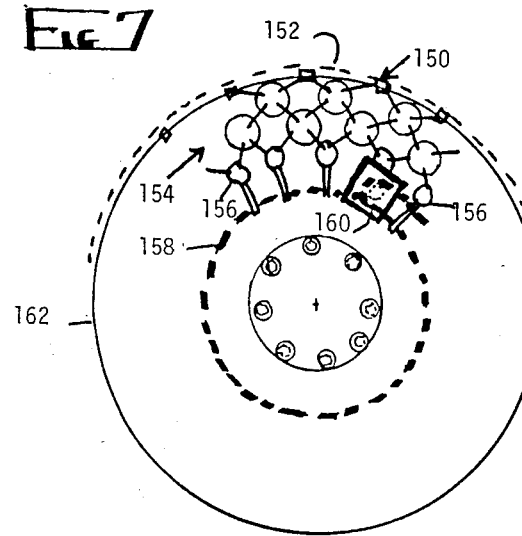
FIG. 9 shows a chain winch of the invention in combination with a tire protective or traction chain which is fitted to a tire.

FIG. 9 shows a particular application of the winch for tensioning a tire protective or traction chain 150. In this event the chain 150 has a tread portion 152 and flanking side wall portions 154 the radially inward edges of which are provided with connecting loops 156 through which a tensioning chain 158 passes. One end of the tensioning chain 158 is connected to a chain winch 160 of the type described above while the other end of the tensioning chain 158 passes around the sprocket of the winch as shown schematically. The winch 160 is permanently secured to the side wall 154 and, in fact, replaces one of the connecting loops 156. The winch 160 differs from the winches described previously in that it does not have a brake device as this is not required for this particular application.

In use the chain is fitted to a tire 162 in the usual manner and the tensioning chain is threaded through the connecting loops 156 and engaged with the winch 160. The drive nut of the winch is then turned to tension the chain with the pawl automatically ensuring that the sprocket cannot move in the reverse direction. When sufficient tension has been obtained, the vehicle to which the tire is fitted is driven for about 5 minutes to allow the chain 150 to settle and the tensioning chain 158 to move relatively to the connecting loops 156 to accommodate unequal forces on it. Thereafter the tensioning operation is repeated and the vehicle again re-driven. This is repeated a number of times until the required tensioning is obtained. The free end of the tensioning chain is then simply threaded backwards through some of the loops 156 and held in position by a nut and bolt. During use the chain 150 will wear, which wear allows the chain to slacken on the tire causing rapid wear of the chain and tire. When the vehicle operator notices such slackness he simply stops his vehicle, applies a spanner to the drive nut of the winch and tensions the tensioning chain. This operation need not take more than one minute or so and can be done as frequently as required without disrupting the normal operation of the vehicle. This contrasts with normal tensioning of a chain using levering spanners or the like which can take up to half an hour for re-tensioning. The winch of the invention is particularly suited to this application as it can withstand the abuse arising during use of the tire chain and particularly because it is not sensitive to variations in dimensions of the tensioning chain 158.

I claim:

1. A chain winch for transmitting motion to an open link chain, the chain winch comprising a housing; sprocket means rotably supported in the housing, the sprocket means having a plurality of substantially radially extending pin formations and suitably dimensioned flat tangential faces for engaging selected links of the chain with at least portions of a circumferential groove being formed centrally in the flat faces whereby as a chain is trained around the sprocket wheel said flat faces receive alternate flatwise disposed links there against and alternate edgewise disposed links which interconnect the flatwise disposed links are accommondated in said groove portions; drive means for rotating the sprocket means; and resiliently biased latch means supported in the housing and arranged in use automatically to engage the links of a chain to permit motion of the chain in the tensioning direction while preventing motion of the chain in the opposite direction.

2. A chain winch as claimed in claim 1, in which the latch means is resiliently biased by means of a suitable spring mounted on the housing and is movable between a first position in which it can engage a link of a chain which passes around said sprocket means to prevent undesired motion of said chain and a second position in which such motion is permitted, a land being formed on the latch means at a position to abut said spring when the latch means is in its second position thereby to hold the latch in said second position the latch means being setable in the second position.

3. A chain winch as claimed in claim 1, which includes brake means for the sprocket means.

4. A chain winch as claimed in claim 3, in which the brake means comprises a cylindrical brake member integral with and axially spaced from the sprocket means and an actuating member on the housing for engaging the brake member radially inwardly.

5. A chain winch as claimed in claim 4, in which the actuating member comprises a band extending around at least a portion of the brake member and means for tensioning the band on to the brake member, the band being located with respect to the housing.

6. A chain winch as claimed in claim 4, in which the actuating member comprises shoe means and means for moving the shoe means radially against the brake member.

7. A chain winch as claimed in claim 3, in which the brake means comprises a disc member integral with the sprocket means and means for applying an axial braking force against the disc member.

8. A chain winch as claimed in claim 3, in which the brake means includes a resilient component for ensuring a gradual application of braking forces.

9. A chain winch as claimed in claim 1 including handle means for the housing.

10. A chain winch as claimed in claim 1 wherein the pin formations engage selected alternate chain links on the chain.

11. A chain winch for transmitting motion to an open link chain comprising:
a housing including tow spaced-apart side plates formed with registering holes;
sprocket means in the housing, the sprocket means comprising a central body portion that is polygonal in cross-section to provide flat faces for engaging selected alternate chain links and is formed with a medial circumferential groove to accommodate portions of chain links between the selected alternate chain links, parallel pairs of pins each being secured in a bore formed in a flat face of the body portion, extending substantially radially from the body portion and straddling said groove with the pairs being arranged equiangularly around the body portion whereby in conjunction with the flat faces to engage an open link chain trained around the sprocket, and axle portions extending from opposed sides of the body portion and rotatably received and guided in said holes in said side plates, the body and axle portions being machined from a polygonal cross-section bar;
drive means for rotating the sprocket means, the drive means being positioned externally of the housing and being integral with one of said axle portions;
resiliently biased latch means supported in the housing and arranged in use automatically to engage the links of a chain to permit motion of the chain in the tensioning direction while preventing motion of the chain in the opposite direction;
the housing, sprocket means and latch means being of a suitable steel which has been heat-treated and carburised.

12. In combination a chain winch and a tire protective or traction chain formed of links and including a tread portion, first and second side wall portions flanking the tread portion and apparatus for tensioning the tire chain to hold it onto a tire provided on at least the first side wall portion, the tensioning apparatus comprising a tensioning chain and a plurality of connecting means each having a part through which the tire tensioning chain can pass for connecting the tensioning chain to edge links of the first side wall portion of the tire chain, with the chain winch being connected to one end of the tensioning chain and with the other end of the tensioning chain being tensionable by the chain winch, the chain winch comprising a housing; sprocket means rotatably supported in the housing, the sprocket means having a plurality of substantially radially extending pin formations for engaging selected links of the chain; drive means for rotating the sprocket means to tension the tensioning chain as the sprocket is rotated; and resiliently biased latch means supported in the housing and arranged in use automatically to engage the links of a chain to permit motion of the chain in the tensioning direction while preventing motion of the chain in the opposite direction.

13. The combination of claim 12, wherein the tensioning chain is an open link chain and wherein the sprocket means comprises a plurality of radialy extending pin formations and suitably dimesioned flat tangential faces for engaging selected links of the chain, with at least portions of a circumferential groove being formed centrally in the flat faces whereby as a chain is trained around the sprocket wheel said flat faces receive alternate flatwise disposed links thereagainst and alternate edgewise disposed links which interconnect the flatwise disposed links and are accommodated in said groove portions.

14. The combination as claimed in claim 12, wherein the tensioning chain is an open like chain and the latch means is supported in the housing and is arranged to engage selected links of the tensioning chain to prevent undesired reverse motion of the tensioning chain while permitting motion in the other direction when the winch is operated to tension the tensioning chain.

15. A combination as claimed in claim 12, wherein the latch means automatically prevents undesired reverse rotation of the sprocket means.

* * * * *